Nov. 5, 1946.   E. J. RIOS Y MARQUEZ   2,410,683
FRUIT PEELING DEVICE
Filed Feb. 1, 1944   2 Sheets-Sheet 2
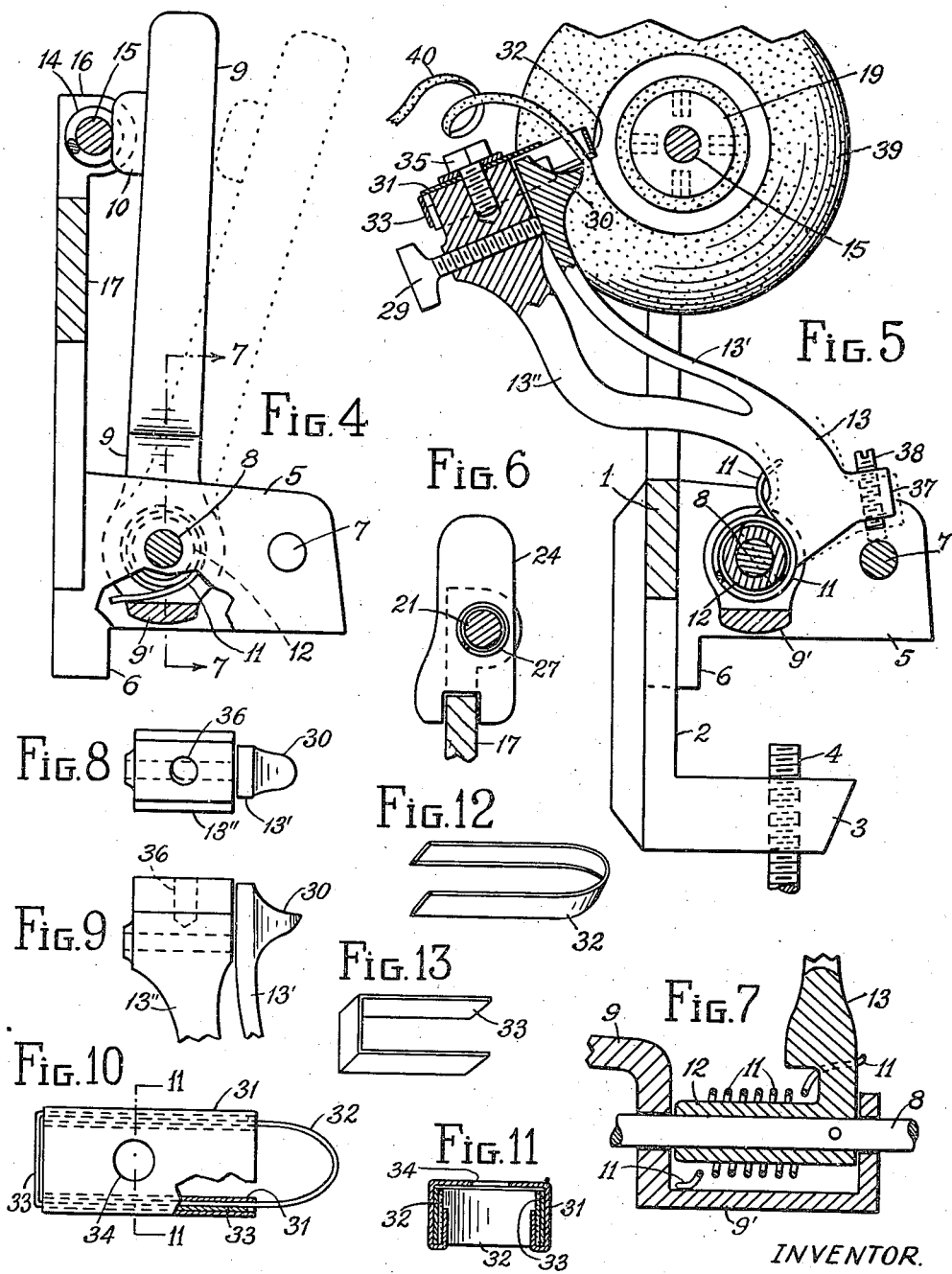
INVENTOR.
ENRIQUE JUAN RIOS y MARQUEZ.
BY
Haseltine Lake & Co.
ATTORNEY.

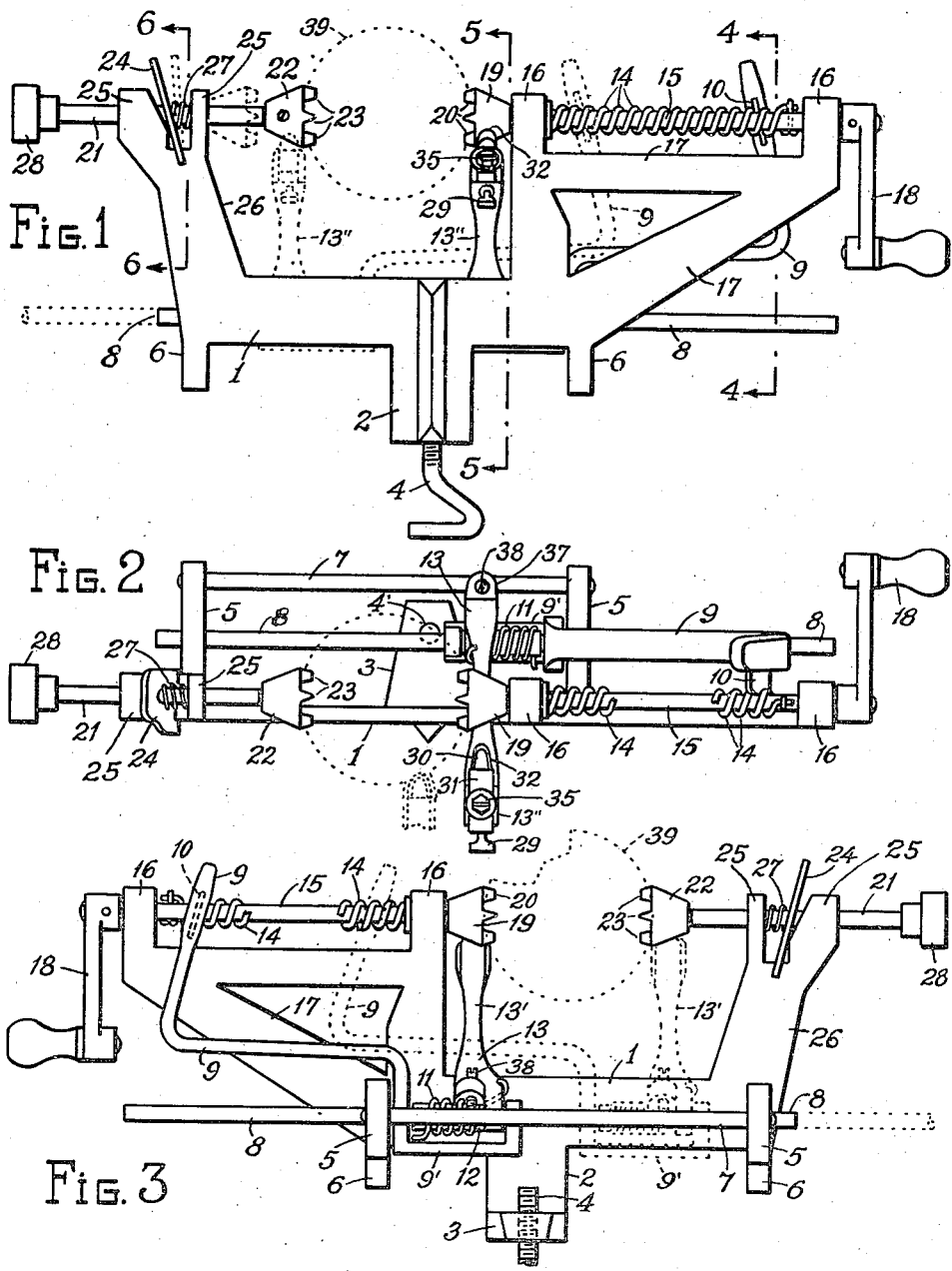

Patented Nov. 5, 1946

2,410,683

UNITED STATES PATENT OFFICE 2,410,683

FRUIT PEELING DEVICE

Enrique Juan Rios y Márquez, Lawton, Habana, Cuba

Application February 1, 1944, Serial No. 520,593
In Cuba February 12, 1943

2 Claims. (Cl. 146—43)

This invention refers to a device for peeling fruits, especially oranges, although it may be used to peel any other fruits, such as apples, pears and others of similar rinds or skins; and has for its principal object to provide a device for such a purpose that is of simpler construction, easier and more efficient operation and lower cost than those so far known for this purpose.

The invention is herein described in conjunction with the figures of the appended drawings, wherein like reference characters designate identical parts throughout the different views.

In the drawings:

Figure 1 is a front elevation of the device covered by the present invention;

Fig. 2 is an upper plan view thereof;

Fig. 3 is a rear elevation thereof;

Fig. 4 is a cross section, to an enlarged scale, taken along the line 4—4 of Fig. 1, in the direction of the arrows;

Fig. 5 is a cross section, to an enlarged scale, taken along the line 5—5 of Fig. 1, in the direction of the arrows;

Fig. 6 is a detailed cross section taken along the line 6—6 of Fig. 1, and looking in the direction of the arrows;

Fig. 7 is a detailed section, along the line 7—7 of Fig. 4, in the direction of the arrows;

Fig. 8 is a detailed upper plan view of the cutter holder.

Fig. 9 is a side elevation of the cutter holder.

Fig. 10 is an upper plan view of the cutter and its guard.

Fig. 11 is a detailed cross section along the line 11—11 of Fig. 10, in the direction shown therein;

Fig. 12 is a perspective view showing the cutter, alone, in detail; and,

Fig. 13 is a detailed perspective view of a portion of the cutter guard.

Reference to the above drawings shall disclose that 1 designates a supporting frame from the central portion whereof projects downwardly a boss 2 having flange 3 bent inwardly and provided with a screw 4 suitable for clamping the device to a table or other supporting means; said frame having arms 5 that extend horizontally and rearwardly, and dependant brackets 6 that act as limiting stops when the device is positioned for operation and clamped by screw 4.

Between arms 5 are mounted two horizontal rods or shafts, one fixed, 7, the other slidable, 8. Shafts 7 and 8 are substantially parallel to each other and to the long dimension of frame 1.

Slidably mounted on shaft 8 is a U-shaped member 9' which constitutes the lower extremity of a double-bend arm 9 having at the inner face of its upper extremity a single screw-thread tooth 10. Between the two uprights of member 9', a bushing 12 is secured to shaft 8. Bushing 12 is an integral part of a bifurcated or forked supporting arm 13 having two branches 13' and 13". On the upper extremity of arm 13 is mounted a peeling cutter, as described hereinafter. The free end of spring 11 coiled on bushing 12, acts upon said arm 13.

Tooth 10 meshes with a horizontal helical member, formed preferably, as illustrated, by the combination of a horizontal rotating shaft 15 on which has been coiled a wire 14 so as to form a helix, shaft 15 is mounted between supports 16 of a raised frame 17 that is integral with the main supporting frame 1. To the outer end of shaft 15 is secured a crank 18, and to the inner end is fixed a driving head 19 provided with suitable teeth or barbs 20.

In alignment with shaft 15 is a rotating and slidably mounted shaft 21 carried by a bushing mounted on the forked end 25 of upright 26 that is an integral part of supporting frame 1. On the inner end of said shaft 21 is, rotatably mounted, a holding head 22 also provided with teeth or barbs 23. In that part of shaft 21 that is encompassed by the opening of fork 25 is a retaining member 24 that prevents retrocession of shaft 21 operated by a spiral spring 27. The outer extremity of shaft 21 is provided with operating knob 28.

To the upper extremity of branch 13" of arm 13 is threaded a screw 29 which exerts pressure against the other branch 13' the upper portion whereof forms a recessed extension 30 which is located below cutter guard 31 consisting of a holder into which is fitted, under pressure, a U-shaped cutter 32, shown in detail in Fig. 12, additional support being given thereto by piece 33, shown in detail in Fig. 13. The upper part of the holder or clip 31, called also a guard, has a hole 34 for attaching screw 35 which threads into a hole 36 in the end 13" of the branch.

At the lower end of arm 13 there is a projection or lug 37 through which is threaded a screw 38 serving to position the assembly frictionally with respect to shaft 7.

The operation of this device is as follows:

Assuming that the fruit to be peeled is an orange, 39. Said orange is placed between holding heads 19 and 22; retaining member 24 is brought to position shown by dotted lines in Fig.

1, and grasping knob 28 shaft 21 is pushed forward until barbs 23 are embedded into the end of the fruit, while the other end of the piece is secured by means of barbs 20 of the directly opposite head 19, it being advisable to position the fruit in such a manner that its axis shall be parallel to and in alignment with shafts 15 and 21. Having done the above, retaining member 24 that holds shaft 21 is released, and crank 18 is turned, which, by means of the meshing of tooth 10 with helix 14, will cause cutter 32 carried by arm 13 to move in the direction of head 22, simultaneously paring off the strip of skin or peel 40 of the orange 39, by reason of the rotation thereof, the greater or lesser depth of cut being regulated by screw 29 which presses branch 13' the recessed extension 30 whereof approximates to or withdraws from the bent end of cutter 32 as shown in Fig. 5, thus determining the separation between said bent end and extension 30, and regulating the depth of cut.

Screw 38 maintains the spaced relation between the lower extremity of arm 13 and fixed shaft or rod 7, so that cutter 32 shall be held separated from holding heads 19 and 22.

Upon completion of the peeling operation tooth 10 is withdrawn from mesh with worm 14 and arm 9 is slid jointly with rod 8 so that said arm shall re-engage its tooth 10 with the worm or helix 14 as shown in full lines in Figs. 1, 2 and 3.

The orange shall have been completely peeled, with the exception of the small caps secured by barbs 20 and 23.

I claim:

1. A machine for peeling fruit comprising, in combination, a supporting frame having a clamping screw whereby said frame is adapted to be secured to a support, two horizontal shafts in alignment one with the other and provided at their corresponding inner extremities with holding heads having barbs suitable for securing fruit between them, one of said shafts being rotatably mounted on said frame, the other of said shafts being rotatably and slidably mounted on said frame, a retaining mechanism cooperating with said frame and bearing against a spring for the purpose of preventing axial movement of said slidable shaft away from said fruit said mechanism being manually operable to allow slidable movement of said slidable shaft relative to said frame, a worm formed by a helically coiled wire secured around said rotatable shaft, a crank secured to the outer extremity of said rotatable shaft, two horizontal and parallel rods located below said shafts and mounted on said supporting frame, one of said rods being fixed and the other slidable relative to said frame, a U-shaped support member slidably mounted on said slidable rod, an upwardly extending arm integral with and carried by said support member, a tooth adapted to coact with said worm mounted on the free end of said arm whereby rotation of said rotatable shaft causes longitudinal movement of said U-shaped support relative to said slidable rod and said frame, a bushing mounted on said slidable rod between the two branches of said U-shaped support, an upwardly extending curved arm carried by said bushing, said curved arm being forked to form two branches at its upper part, a spring coiled on said bushing for maintaining said forked arm under tension and tending to force said forked arm towards said holding heads, a U-shaped peel cutter removably mounted on the upper extremity of one of said branches of said forked arm, the other of said branches of said forked arm having at its end portion a projection extending beneath said cutter for a distance sufficient to leave a desired portion of the cutter extending beyond said projection, a screw thread through the upper end of the cutter carrying branch with its projecting end bearing against the extremity of said projection carrying branch, said screw being manipulatable to move said projection toward and from the bent end of said cutter, thereby adjusting the distance of said cutter which extends beyond said projection, the lower end of said forked arm having a portion extending angularly relative to said forked arm, an adjustable lug carried by said portion, said lug slidably engaging said fixed rod so as to limit rotation of said forked arm and said cutter toward said holding head, thus counteracting the tension of said spring coil on said bushing.

2. A device for peeling fruit or the like comprising, in combination, a supporting frame, means for securing said frame to a support, two horizontal shafts, having at their inner extremities barbed heads for holding fruit, suitably mounted on said supporting frame, one of said shafts being rotatable and the other slidable and rotatable relative to said frame, a releasable retaining mechanism comprising a spring and a plate member coacting with said spring and said frame to prevent axial movement of said slidable shaft relative to said frame, two rods located on said supporting frame parallel to said shafts, one of said rods being slidable and the other of said rods being fixed relative to said frame, an arm held under tension by a second spring so disposed as to move longitudinally of said frame with said slidable rod, a holder carried at the free end of said arm, a substantially U-shaped peel cutter carried by said holder, said holder comprising an inverted channel-shaped member, the lower portion of the legs of said channel-shaped member being folded inwardly and substantially parallel to the remaining portions of said legs to form substantially U-shaped slots, the legs of said U-shaped cutter being slidably receivable in said slots with the bent portion of the U-shaped cutter extending outwardly beyond said holder at one end thereof, another U-shaped member having its legs receivable in the opposite ends of said slot and being effective to clamp the legs of said cutter in firmly locking arrangement within said holder, a helical wire secured around a part of said rotatable shaft, a second arm angularly related to said rotatable shaft and said slidable rod and mounted to extend upwardly from said slidable rod, said second arm having at its free end a tooth adapted to mesh and coact with said helical wire whereby rotation of said rotatable shaft is effective to move said arms along said slidable rod, said first mentioned arm being forked, said holder for said cutter being mounted on one of the branches of said forked arm, the other branch of said arm carrying at its end means for regulating the depth of cut of said cutter, and means for maintaining said peel cutter clear of said holding heads.

ENRIQUE JUAN RIOS Y MÁRQUEZ.